United States Patent [19]

Couwenbergs

[11] Patent Number: 4,860,875
[45] Date of Patent: Aug. 29, 1989

[54] ROLL-BLOCK AND TO A ROLL-WAY ASSEMBLED FROM ROLL BLOCKS

[76] Inventor: Paul Couwenbergs, Scheibenbergstrasse 17, 7500 Karlsruhe, Fed. Rep. of Germany

[21] Appl. No.: 127,295
[22] PCT Filed: Feb. 14, 1987
[86] PCT No.: PCT/EP87/00079
§ 371 Date: Oct. 29, 1987
§ 102(e) Date: Oct. 29, 1987
[87] PCT Pub. No.: WO87/05280
PCT Pub. Date: Sep. 11, 1987

[30] Foreign Application Priority Data
Mar. 3, 1986 [DE] Fed. Rep. of Germany ....... 3606889
Aug. 8, 1986 [DE] Fed. Rep. of Germany ....... 3626958

[51] Int. Cl.⁴ .................................... B65G 13/00
[52] U.S. Cl. .................... 193/35 MD; 193/37; 104/135
[58] Field of Search ............ 193/35 A, 37, 35 F, 193/35 J, 35 MD, 35 R; 104/135

[56] References Cited

U.S. PATENT DOCUMENTS

| | | | |
|---|---|---|---|
| 830,853 | 9/1906 | Thompson | 193/40 X |
| 1,963,956 | 6/1934 | Craig | 193/35 MD |
| 2,555,078 | 5/1951 | Gaylor | 193/37 UX |
| 2,949,992 | 8/1960 | Weinberg | 193/35 MD |
| 3,422,732 | 1/1969 | York | 193/37 |
| 3,473,483 | 10/1969 | York | 104/135 |
| 3,559,802 | 2/1971 | Eidus | 193/35 MD X |
| 3,682,284 | 8/1972 | Sakamoto | 193/35 MD |
| 3,874,749 | 4/1975 | Maniak | 193/35 MD X |
| 3,920,290 | 11/1975 | Evarts | 193/35 MD X |
| 4,036,345 | 7/1977 | Webb | 193/35 MD X |
| 4,060,252 | 11/1977 | Mowery | 193/35 MD X |
| 4,347,794 | 9/1982 | Nordström | 193/35 MD X |
| 4,381,054 | 4/1982 | Rumpel | 193/35 MD |
| 4,553,795 | 11/1985 | Takagi | 193/35 MD X |
| 4,706,793 | 11/1988 | Masciarelli | 193/35 MD X |

FOREIGN PATENT DOCUMENTS

| | | |
|---|---|---|
| 2461656 | 2/1981 | France . |
| 169512 | 8/1974 | New Zealand . |
| 117396 | 10/1958 | U.S.S.R. . |
| 1277576 | 6/1968 | United Kingdom . |
| 1264231 | 10/1969 | United Kingdom . |
| 1360728 | 7/1974 | United Kingdom . |

Primary Examiner—Frank E. Werner
Assistant Examiner—D. Glenn Dayoan
Attorney, Agent, or Firm—Lee & Smith

[57] ABSTRACT

A roll-way is assembled from roll blocks to permit frictionless displacement of goods or vehicles placed thereupon. The roll blocks contain a base body having a roll surface into which there is embedded a multitude of rolling balls that are closely spaced from each other and located in associated spherical cavities. The rolling balls protrude from the associated spherical cavities by less than half of their circumference and are embedded in a rollingly movable manner in the roll surface.

14 Claims, 8 Drawing Sheets

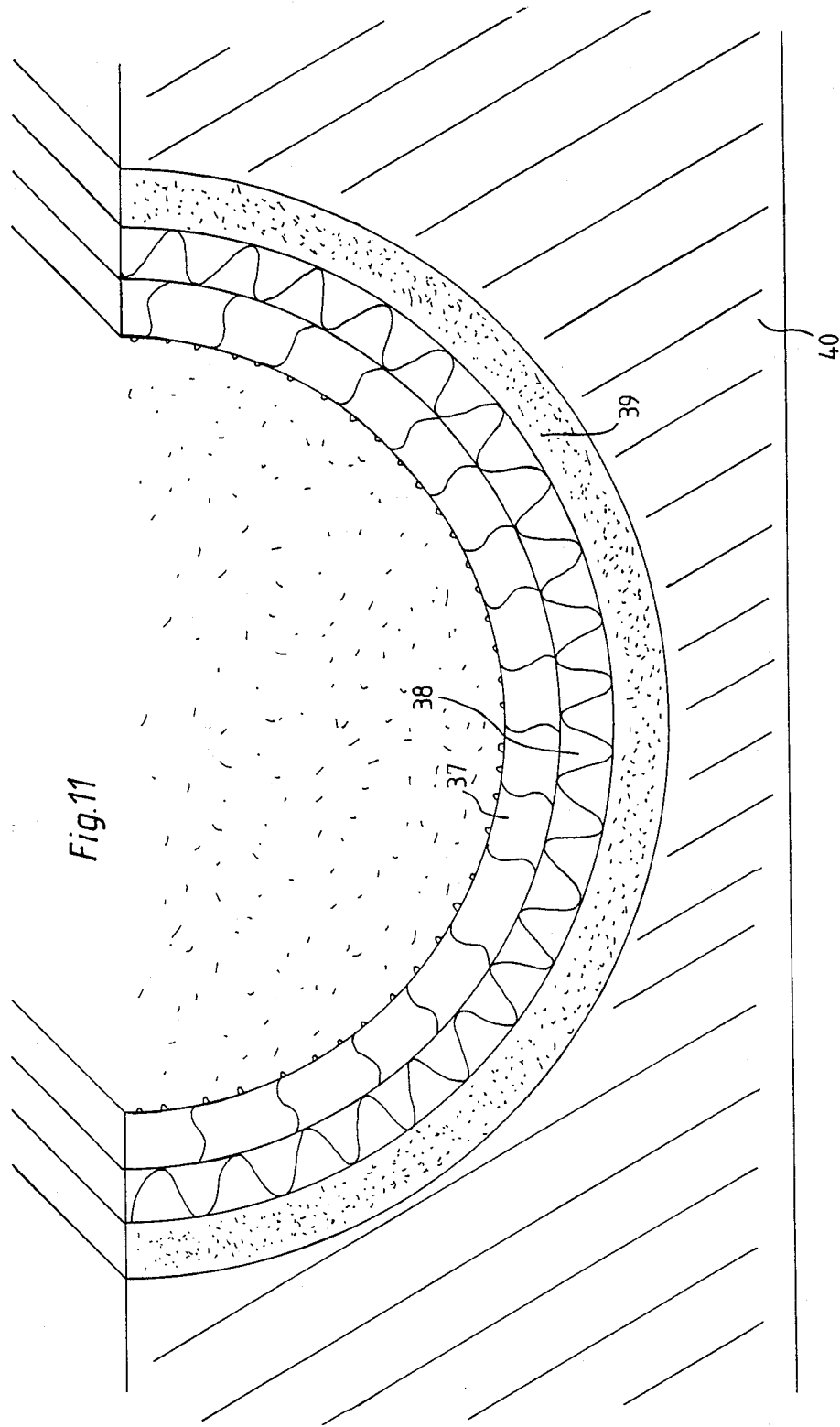

ROLL-BLOCK AND TO A ROLL-WAY ASSEMBLED FROM ROLL BLOCKS

TECHNICAL FIELD

The invention relates to a roll block and to a roll-way which is assembled from a multitude of such roll blocks.

DISCLOSURE OF THE INVENTION

It is the object to be achieved by the invention to provide a roll block and a roll-way assembled from such roll blocks which permit frictionless displacement of goods or vehicles placed thereupon.

According to the invention this object is achieved in respect of the roll block in that the roll block contains a base body possessing a roll surface into which there is embedded in a rollingly moveable manner a multitude of rolling balls which are closely spaced from each other and located in associated spherical cavities. The rolling balls protrude from the associated spherical cavities by less than half their circumference.

The roll surface of the inventive roll block, due to the presence of the rolling balls, forms a rolling support which permits a particularly easy displacement of objects, goods or vehicles placed upon the roll blocks. In this arrangement the rolling balls are embedded in the spherical cavities such that contamination of the bearing support is precluded to a wide extent. The base body and the rolling balls can be manufactured from common materials in a manner such that there is achieved adaptation to the load occurring in each instance. Advantageous constructions of the inventive roll blocks are characterized in dependent claims.

The inventive roll-way is assembled from the roll blocks which are provided at least at a portion of their circumference with engagement elements for producing an interengaging connection between adjacent roll blocks. Such roll-ways can be laid in a rectilinear or curved shape and may also be laid such as to form a tunnel tube.

BRIEF DESCRIPTION OF THE DRAWINGS

Exemplary embodiments of the invention are illustrated in the drawings and will be explained and described in detail hereinbelow with reference to the drawings. There are shown in FIG. 1 a section through a first exemplary embodiment of the inventive roll block;

FIG. 11 a schematic illustration of a third exemplary embodiment of the inventive roll-way.

PREFERRED MODES FOR CARRYING OUT THE INVENTION

Figure 1:
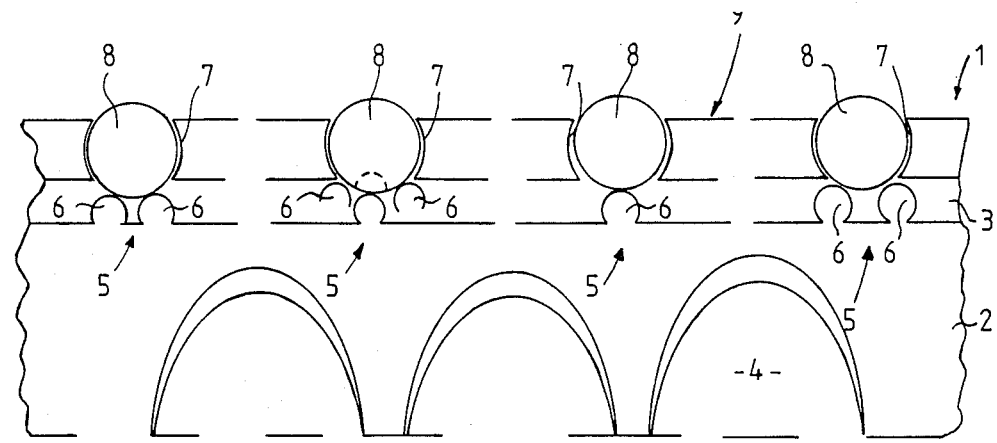

A first exemplary embodiment of the roll block is illustrated in sectional view in FIG. 1. It will be recognized therein that the base body 1 of the roll block comprises a support member 2 and a cover member 3 which are fixedly interconnected in a manner described further hereinbelow in conjunction with FIG. 4. As illustrated, the support member 2 may be provided with recesses 4 on the side remote from the cover member 3 but may also be of solid construction. A multitude of bearing elements 5 protrude from the surface of the support member 2 and which surface faces the cover member 3. The bearing elements 5 may be constructed in various manners and FIG. 1 illustrates a number of possible constructions for the bearing elements 5. In each case, however, the bearing elements 5 are formed by spherically shaped bearing bodies 6 and there may be provided a single bearing body 6 or two or more bearing bodies 6 arranged in a mutually spaced relationship. The multiple bearing bodies 6 in this arrangement are arranged such that their bearing locations are positioned on a spherical surface.

The cover member 3 of the base body 1 possesses a multitude of spherical segment-like gaps 7. The mutual connection between the support member 2 and the cover member 3 is effected in a manner such that the bearing elements 5 and the spherical segment-like gaps 7 are aligned relative to each other.

In the assembled state of the support member 2 and the cover member 3 the spherical segment-like gaps 7 form cavities in a roll surface 9 of the base body 1. Rolling balls 8 are inserted into these cavities. The spherical segment-like gaps 7 in the cover member 3 are constructed such that the gaps surround the associated rolling ball 8 at a close spacing over a large portion of its circumference so that less than half, preferably 15 to 25 percent of the circumference of the rolling ball 8 protrudes from the roll surface 9.

The cover member 3 may be made of an elastic material such as an elastic plastic material so that the rolling balls 8, which are made of an only slightly deformable material like plastic, metal or concrete, can be pressed into the cavities which are formed by the spherical segment-like gaps 7 in the cover member 3, after interconnection of the support member 2 and the cover member 3.

During use of the roll block, therefore, the objects, goods or vehicles which are placed upon the roll blocks, bear upon the protruding portions of the rolling balls 8 which are rollingly moveably supported and mounted in the cavities formed in the roll surface 9. Due to such rolling support, the thus placed objects, goods or vehicles can be easily displaced along the roll surface 9.

As already mentioned, the rolling balls 8 are embedded at a close spacing in the associated cavities formed in the roll surface 9 by the spherical segment-like gaps 7 in the cover member 3 so that the support of the rolling balls 8 is secured against contamination. Furthermore there exist free spaces between the bearing elements 5 of the support member 2 and dust particles and water can be removed through the free spaces.

Figure 2:
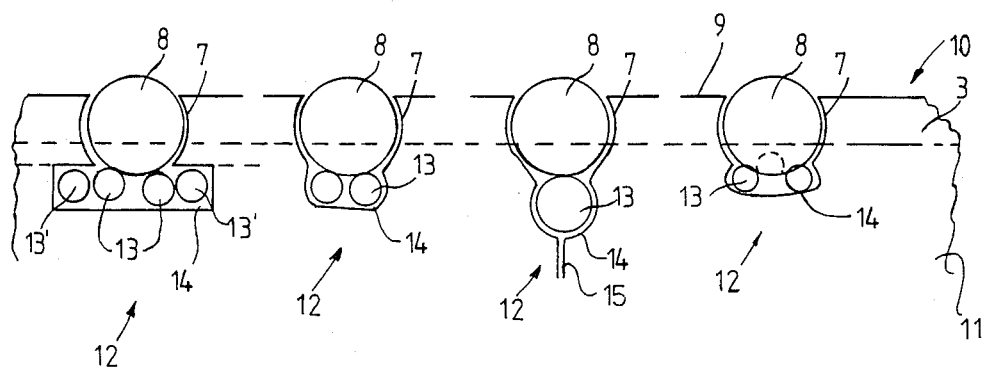
FIG. 2 a section through a second exemplary embodiment of the inventive roll block.

A second exemplary embodiment of the roll block is illustrated in FIG. 2; therein elements constructed similar to corresponding elements in FIG. 1, are provided with the same reference characters. The base body 10 comprises a support member 11 and a cover member 3 which are interconnected in the manner further described hereinbelow in conjunction with FIG. 4. The support member 11 is provided, in the surface facing the cover member 3, with a multitude of bearing elements 12 which may be constructed in various manners and are illustrated in FIG. 2 in a number of possible constructions. In detail, the bearing elements 12 comprise a single or two or more bearing balls 13 and an associated recess 14 in the support member surface facing the cover member 3. In the presence of a number of bearing balls 13 the recesses 14 in the support member 11 may be formed such that the bearing locations at the bearing balls 13 are arranged at a spherical surface. Furthermore, the bearing balls 13, if desired, may be laterally supported by support balls 13'.

The cover member 3 of the base body 10 possesses a multitude of spherical segment-like gaps 7. The mutual connection between the support member 11 and the cover member 3 is effected in a manner such that the recesses 14 in the support member 11 and the spherical segment-like gaps 7 in the cover member 3 are aligned relative to each other.

In the assembled state of the support member 11 and the cover member 3 the spherical segment-like gaps 7 form cavities in the roll surface 9 of the base body 10. Rolling balls 8 are embedded in these cavities in the manner as in the first exemplary embodiment of the roll block described hereinbefore with respect to FIG. 1.

Also in this embodiment the rolling balls 8 are embedded at a close spacing in the associated cavities formed in the roll surface 9 by the spherical segment-like gaps 7 in the cover member 3 such that the support of the rolling balls 8 is secured against contamination. Furthermore, the recesses 14 in the support member 11 also can be provided with dust and water outlets 15 which partially may be interconnected and which may open into appropriate discharge channels.

Figure 3:
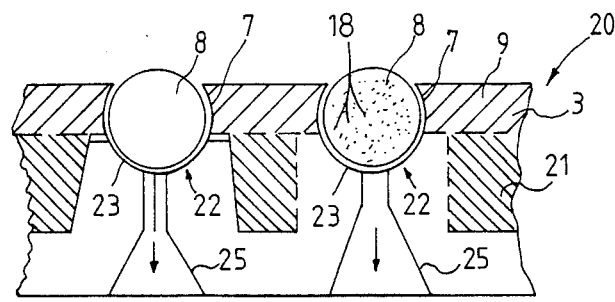
FIG. 3 a section through a third exemplary embodiment of the inventive roll block.

A third exemplary embodiment of the roll block is illustrated in FIG. 3; therein elements constructed similar to corresponding elements shown in FIGS. 1 and 2, are provided with the same reference characters. The base body 20 comprises a support member 21 and a cover member 3 which are interconnected in the manner further described hereinbelow in conjunction with FIG. 4. The support member 11 is provided, in the surface facing the cover member 3, with a multitude of bearing elements 22. In detail, each one of the bearing elements 22 comprises a spherically shaped recess 24 wherein, if desired, a perforated bearing surface can be provided.

The cover member 3 of the base body 20 possesses a multitude of spherical segment-like gaps 7. The mutual connection between the support member 21 and the cover member 3 is effected in a manner such that the spherically shaped recesses 23 in the support member 21 and the spherical segment-like gaps 7 in the cover member 3 are aligned relative to each other.

In the assembled state of the support member 21 and the cover member 3 the spherically shaped recesses 23 and the spherical segment-like gaps 7 complement each other and form cavities in the roll surface 9 of the base body 20. Rolling balls 8 are embedded in these cavities in the manner as in the embodiments of the roll block described hereinbefore with respect to FIGS. 1 and 2.

Also in this embodiment the rolling balls 8 are embedded at a close spacing in the associated cavities formed in the roll surface 9 by the spherical segment-like gaps 7 in the cover member 3 such that the support of the rolling balls 8 is secured against contamination. Furthermore, also in this case the spherically shaped recesses 23 in the support member 21 can be provided with dust and water outlets 25 which partially may be interconnected and which may open into appropriate discharge channels.

In the exemplary embodiments described hereinabove the rolling balls 8 may be provided with an antisoiling surface structure in the form of surface indentations 18. Such surface indentations 18 have a depth in the range of 0.5 to 1.5 mm and practically are distributed over the entire surface of the rolling ball 8. The indentations 18 do not or only insubstantially impair the rolling motion of the rolling balls 8 but cause dust and dirt particles which have penetrated into the support, to be removed from the support due to the rolling motion of the rolling balls 8.

Figure 4:
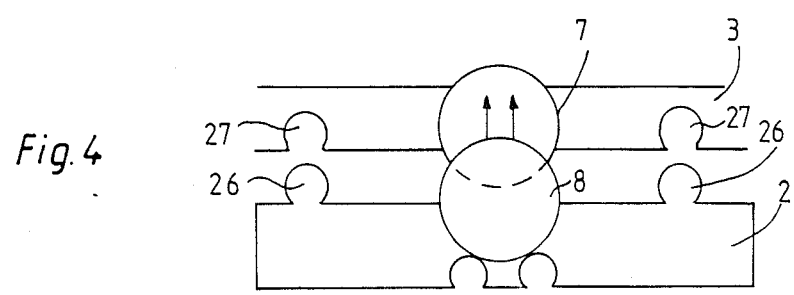
FIG. 4 a schematic illustration of the assembly of the base body of the roll block shown in FIG. 1 from a support member and a cover member.

FIG. 4 shows, in a schematic illustration and with reference to the exemplary embodiment shown in FIG. 1, the type of connection between the support member 2 and the cover member 3. In the roll blocks shown in FIGS. 2 and 3 the connection between the corresponding members to form the respective base bodies 10 and 20 is effected in corresponding manner. The support member 2 and the cover member 3 are provided with opposingly arranged locking elements, in the illustrated exemplary embodiment with locking pins 26 in the support member 2 and locking holes 27 in the cover member 3, which become interengaged when the support member 2 and the cover member 3 are pressed one upon the other and which produce a reliable interconnection between the support member 2 and the cover member 3. The locking elements can be constructed in any other appropriate manner provided that the locking elements produce a secure connection between the support member 2 and the cover member 3 upon interengagement so that the bearing elements 5 in the support member 2 are retained in alignment relative to the spherical segment-like gaps 7 in the cover member 3.

Figure 5:
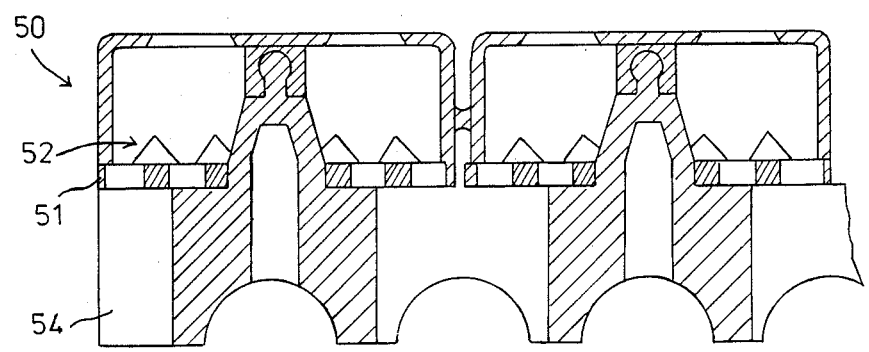
FIG. 5 a section through a fourth exemplary embodiment of the inventive roll block.

A fourth exemplary embodiment of the roll block which advantageously can be mass produced, is shown in section in FIG. 5. There is only shown therein a base body 50 which can be mounted at concrete but also can be cast into concrete. This base body 50 is composed of three members, namely a support member 51 containing bearing elements 52, a cover member 53 containing gaps for receiving the not illustrated rolling balls, and a base member 54 which carries the support member 51 and the cover member 53.

Figure 6A:
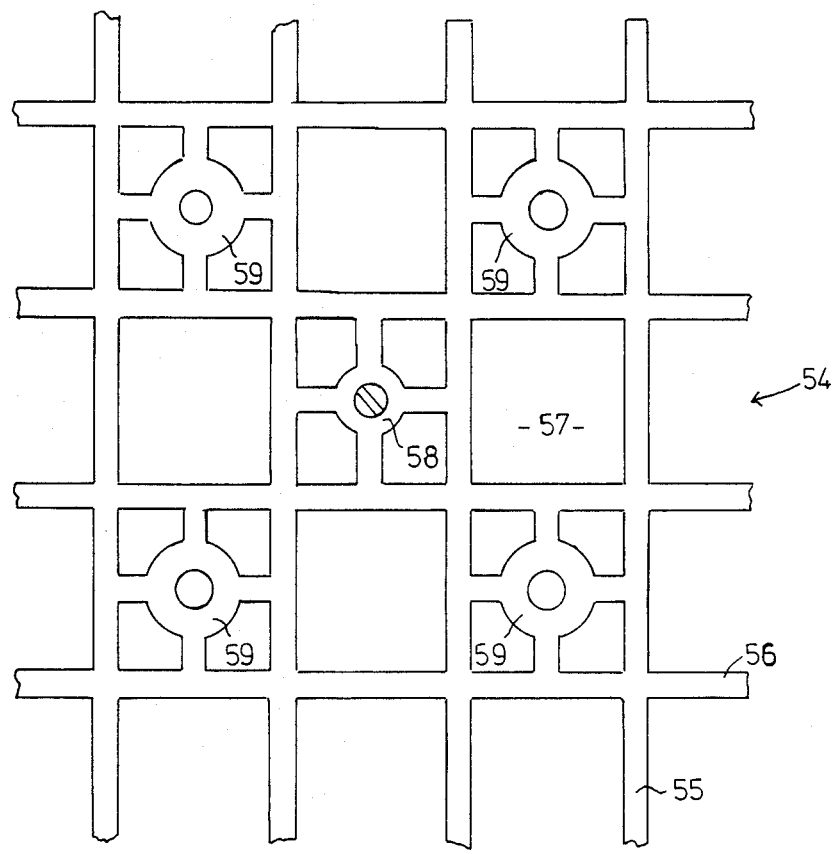
FIGS. 6a and 6b respectively a top plan view and a section of a base member in the roll block shown in FIG. 5.
Figure 6B:
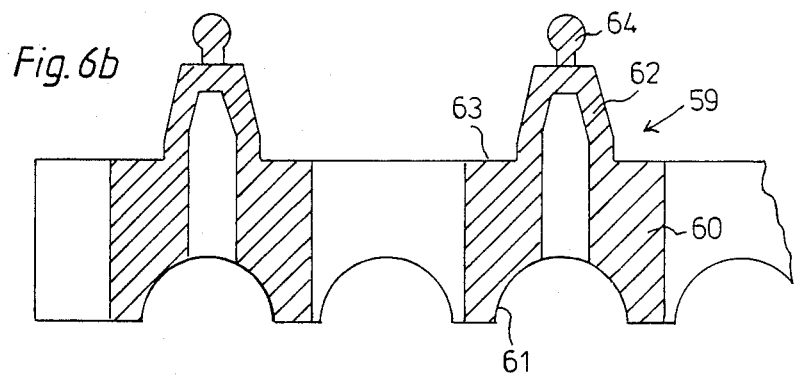

The base member 54 is respectively shown in detail in a top plan view and in section in FIGS. 6a and 6b. The base member 54 forms a lattice-like basic structure which can be manufactured, for example, by injection molding. Mutually perpendicular rods 55 and 56 of the lattice define cavities 57 wherein mounting means are arranged and secured to the rods 55 and 56. First mounting means 58 are provided for fastening the base member 54 at an appropriate base like concrete, for example, by means of bolts. The base member 54, however, may also be cast into concrete. Second mounting means in the form of a stepped support 59 contain a bottom member 60 which is formed below the lattice plane and contains a recess 61 on its underside. The recess 61 may be provided if, for example, heating pipes or the like are intended to be placed under the base member 50. A top member 62 of the support 59 is arranged above the plane of the lattice and offset from the base member 60 by means of a shoulder 63. At its free end the top member 62 is provided with a locking element 64. The first and second mounting means 58 and 59 are arranged in the base member 54 at predetermined spacings. In the illustrated exemplary embodiment each first mounting means 58 is centrally provided between four supports 59 which are arranged in each second cavity 57 of the lattice.

Figure 7:
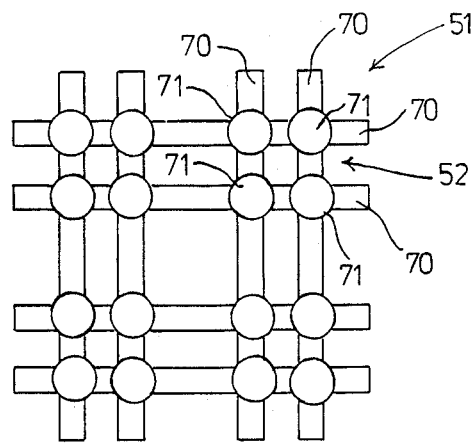
FIG. 7 a top plan view of a support member of the roll block shown in FIG. 5.

The support member 51 is illustrated in top plan view in FIG. 7. The support member 51 is composed of rods 70 which form dual rods in a rectangular arrangement. The internal rods of the dual rods 70 are arranged at a spacing relative to each other such that each internal rod bears upon a bearing surface of the base member 54, which bearing surface is formed by the shoulder 63 of the associated support 59, and is clamped to the top member 62 of such associated support 59. The bearing elements 52 are formed at the crossing points of the dual rods 70. In the illustrated exemplary embodiment there is provided one support member 51 for each support 59 and each support member 51 carries at each corner a bearing element 52 for bearing an associated one of the rolling balls 8 described further hereinbefore. There may also be provided, however, support member 51 which extend over a number of supports 59. In the illustrated exemplary embodiment each bearing element 52 forms four bearing bodies in the shape of cones such that each rolling ball 8 is supported at the conical surfaces of the four cones. Instead of the conical shape there may also be provided any other appropriate shape of bearing elements for rollingly supporting the rolling balls or any other distribution of individual bearing elements, for example, spherical bearing elements as shown in FIGS. 1 to 4.

Figure 8A:
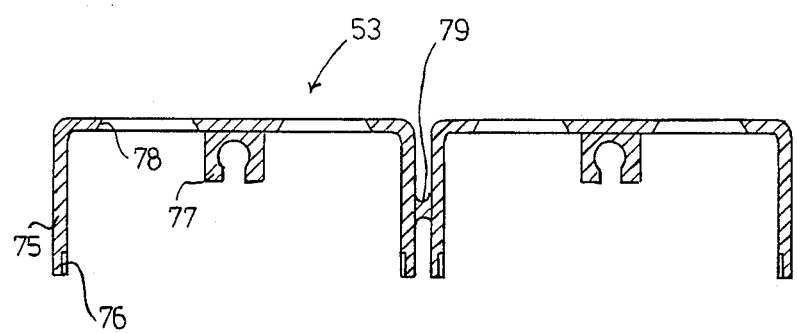
FIGS. 8a and 8b respectively a section and a top plan view of a cover member of the roll block shown in FIG. 5.
Figure 8B:
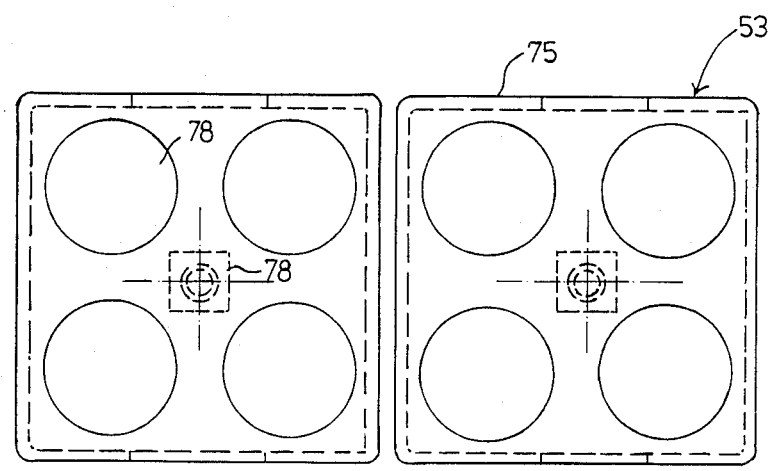

The cover member 53 is respectively illustrated in section and in top plan view in FIGS. 8a and 8b and comprises individual elements each of which is associated with one support 59 of the base member 54. Each element is manufactured from a hard polyamide possessing a smooth surface permitting sliding movement and has a box-like basic structure which is open on one side. The side walls 75 of each element are provided on the open side of the element and on the interior side thereof with recesses 76 for receiving the free ends of the dual rods 70 of the support member 51 and are connected with the support member 51 in this manner. Each element further comprises at its closed side a locking member 77 which faces the support 59 and receives the locking element 64 at the top member 62 of the support 59 and thereby ensures a fixed but releasable connection between the base member 54, the support member 51 and the cover member 53. The same type of connection also can be realized by arranging the locking member at the top member 62 of the support 59 and the locking element at the associated element of the cover member 53. The side which is provided with the locking member 77 or, if desired, with the locking element 64 of the cover member 53, furthermore is provided with gaps 78 which are aligned to the bearing elements 52 of the support member 51 such that the rolling balls 8 which are rollingly supported at the bearing elements 52, outwardly protrude through the gaps 78 and thereby result in the aforementioned rollingly moveable support for objects supported at the roll block. The side walls of the gaps 78 are bevelled in adaptation to the rolling balls 8 or, if desired, may also be constructed in a spherical segment-like manner. The elements of the cover member 3 and which elements are associated with adjacent supports 59, are interconnected by means of flexible links 79; these links 79, on the one hand, effect a moveable linkage between the adjacent elements and, on the other hand, form predetermined points of fracture at which the elements, if desired, can be readily separated from each other.

Figure 9:
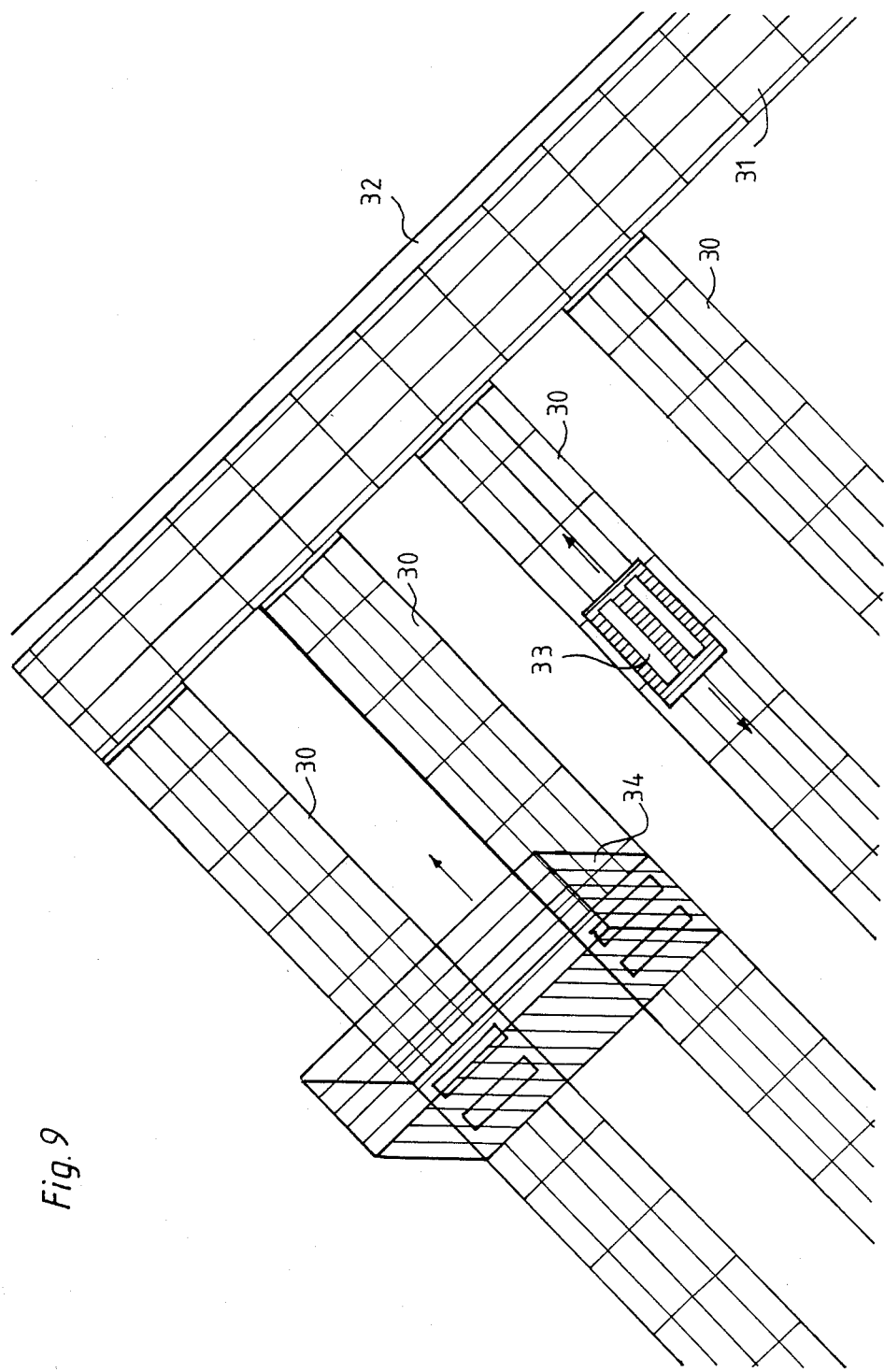
FIG. 9 a schematic illustration of a first exemplary embodiment of the inventive roll-way.

A first exemplary embodiment of a roll-way 30 is schematically illustrated in FIG. 9. The roll-ways 30 are formed in such a manner that the individual roll blocks of the type as described hereinbefore in conjunction with FIGS. 1 to 8, are provided on their circumferential side with interengaging elements such as locking elements. Thus the roll blocks can be brought by locking into a mutual interengaging connection and thereby can be assembled to form roll-ways 30 having lengths as desired in each instance. FIG. 9 shows a total of four parallel extending roll-ways 30 which are connected to a transverse and also rectilinearly extending roll-way 31. The roll-way 31 extends along a pier 32 so that the entire arrangement of the roll-ways 30 and 31 can be used for loading ships but, of course, also can be employed in connection with many other possible loading and unloading operations. As illustrated, on each roll-way 30 there can be displaced pallets 33, if desired, on a carrier along the roll-way. Also, containers 34 can be brought up to the loading location on two adjacent roll-ways 30 which are advantageously arranged in a spaced relationship.

Using appropriately shaped roll blocks, there can also be assembled not particularly illustrated roll-ways containing curved paths.

Figure 10:
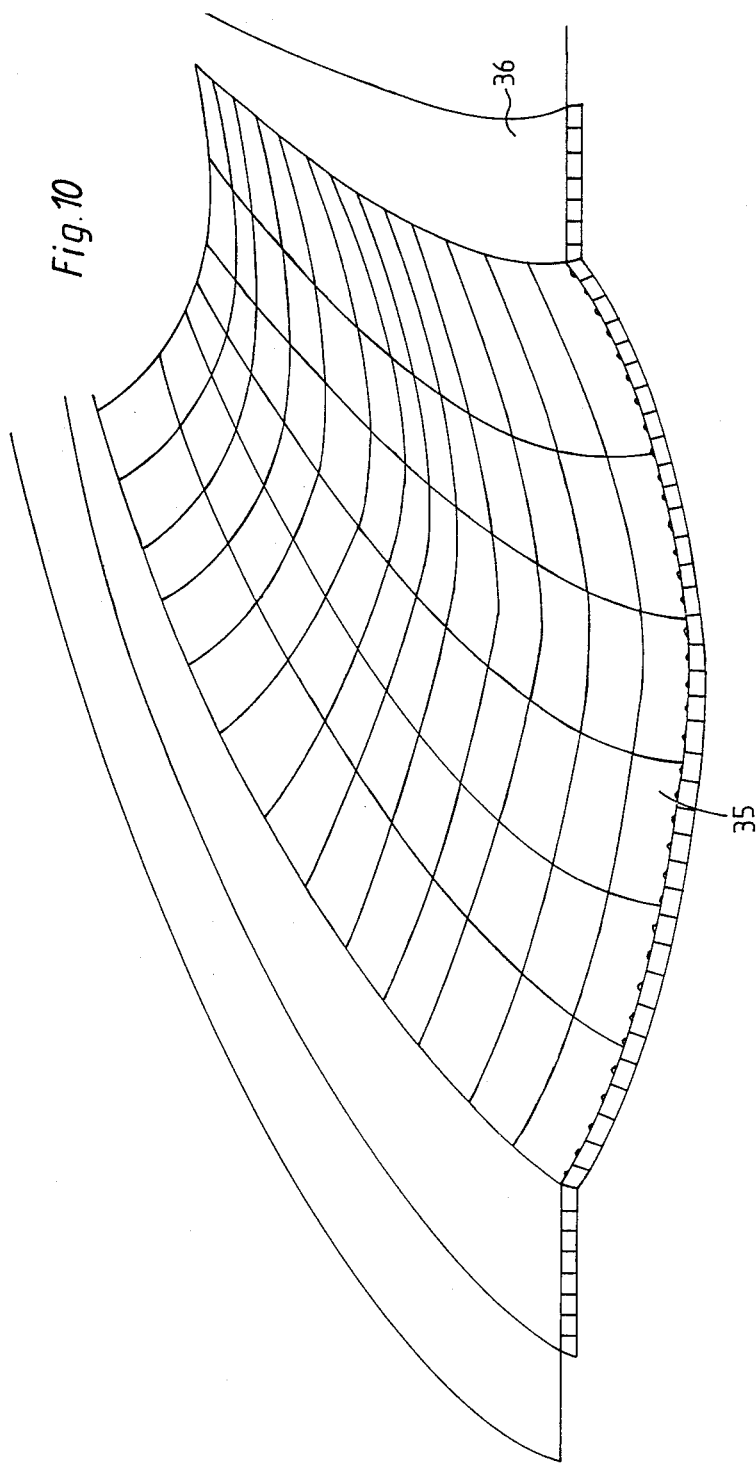
FIG. 10 a schematic illustration of a second exemplary embodiment of the inventive roll-way.

In FIG. 10 there is illustrated as a second exemplary embodiment an arcuate roll-way 35 which is assembled from the roll blocks as shown in FIGS. 1 to 8 in the manner described hereinbefore in conjunction with FIG. 9. Advantageously there is provided therein an appropriate not specifically illustrated support for the not self-supporting roll-way 35. Such arcuate roll-ways are suitable, for example, for the collective transport of relatively smaller objects or goods along a descending path.

Moreover, a roll-way of the type of the roll-way 35 can also be utilized in the manner of a roll- or slideway for a variety of playing and sporting purposes. In this context and particularly with respect to extended descending paths it is preferable to provide adjacent the roll-way 35, if desired, on both sides a braking path 36 which is equipped with a suitable braking cover, for example, made of rubber.

In the third exemplary embodiment illustrated in FIG. 11, a roll-way 37 is formed with a semicircularly shaped cross-section. In the same manner there can also be constructed, if desired, a closed, i.e. tunnel-like roll-way. Also this construction, due to the insignificant friction, can be employed with advantage for conveying relatively smaller objects or goods, for example, in installations of the type of a tube conveyor but can be utilized in the same manner for playing and sporting purposes, for example, in connection with a bobsleigh-course.

In detail, the roll blocks for forming the roll-way 37 are placed on top of a bottom lining 38 which may be elastically constructed in order to absorb shocks. The bottom lining 38, in turn, bears upon the actual carrier 39 which is retained in an appropriate foundation or in a suitable support structure. Such settings of the roll blocks generally are of conventional type and, therefore, are not described in detail.

I claim:

1. A roll block comprising:
   a base member having a bottom side for connection to a foundation, and a top side;
   a support projecting outwardly from and above said top side of said base member;
   a bearing support member mounted at said support;
   said bearing support member defining a plane and containing a multitude of groups of integral bearing elements protruding from said plane;
   said multitude of groups of bearing elements being symmetrically located with respect to said support;
   a multitude of rolling balls each of which is rollingly supported at a respective one of said groups of bearing elements;
   a cover member covering said support and said bearing support member on said top side of said base member;
   said cover member being mounted at said support; and
   said cover member containing a multiple number of gaps each of which is aligned to one group of said multitude of groups of bearing elements of said bearing support member wherein one of said rolling balls supported by said one group of bearing elements, partially protrudes outwardly of a respective one of said gaps.

2. The roll block as claimed in claim 1, wherein;
   each one of said base member, said support, said bearing support member and said cover member is made of plastics;
   a plural number of supports, the plural number of said supports projecting above said top side of respective ones of a plural number of said base members;
   a plural number of bearing support members, the plural number of said bearing support members being mounted at associated ones of said plural number of supports; and
   a plural number of cover members, the plural number of said cover members being mounted at associated ones of said plural number of supports.

3. The roll block as claimed in claim 1, further including:
   interengaging locking elements at said cover member and said support for releasably mounting said cover member at said support which projects from said top surface of said base member.

4. The roll block as claimed in claim 1, wherein;
   said bearing support member contains a predetermined number of rod-shaped members arranged to surround said support; and
   said multitude of groups of bearing elements being arranged with substantially equal mutual spacings at said predetermined number of rod-shaped members.

5. The roll block as claimed in claim 4, wherein:
   said predetermined number of rod-shaped members constitutes four rod-shaped members interconnected in a rectangular shape centered with respect to said support and defining four corners;
   each one of said four rod-shaped members being constituted by two rods which extend substantially parallel to each other;
   said multitude of groups of bearing elements encompassing four groups of bearing elements; and
   each one of said four groups of bearing elements containing four bearing elements protruding from one of said four corners of said rectangular shape.

6. The roll block as claimed in claim 5, wherein;
   each one of said bearing elements which protrude from said plane defined by said bearing support member, has a substantially conical ball supporting surface.

7. The roll block as claimed in claim 1, wherein;
   said base member contains recesses on said bottom side of base member.

8. The roll block as claimed in claim 3, wherein:
   said cover member is of a box-shaped configuration which is open towards said top side of said base member;
   said cover member having a wall facing said top side of said base member; and
   said wall containing said multiple number of gaps and said locking element for interengagement with said locking element at said support.

9. The roll block as claimed in claim 2, further including:
   flexible links interconnecting adjacent ones of said plural number of cover members.

10. The roll blocks as claimed in claim 1, wherein
    said rolling ball is provided with a multitude of surface indentations; and
    said surface indentations being distributed over the entire surface of said rolling ball and having a depth in the range of 0.5 to 1.5 mm.

11. A roll-way comprising:
    a multitude of interconnected roll blocks;
    each one of said multitude of interconnected roll blocks containing:
    a base member having a bottom side for connection to a foundation, and a top side;
    a support projecting outwardly from and above said top side of said base member;
    a bearing support member mounted at said support;
    said bearing support member defining a plane and containing a multitude of groups of integral bearing elements protruding from said plane;
    said multitude of groups of bearing elements being symmetrically located with respect to said support;
    a multitude of rolling balls each of which is rollingly supported at a respective one of said groups of bearing elements;
    a cover member covering said support and said bearing support member on said top side of said base member;
    said cover member being mounted at said support; and
    said cover member containing a multiple number of gaps each of which is aligned to one group of said multitude of groups of bearing elements of said bearing support member wherein one of said rolling balls supported by said one group of bearing elements partially protrudes outwardly of a respective one of said gaps;
    locking elements for interconnecting adjacent ones of said multitude of roll blocks; and
    said multitude of roll blocks being interconnected such as to form an arcuate cross-section of the roll-way.

12. The roll-way as claimed in claim 11, wherein:

said arcuate cross-section extends at least partially along a substantially circular arc.

13. The roll-way as claimed in claim 11, wherein:

said multitude of interconnected roll blocks defines at least one side which constitutes at least one side of the roll-way;

a braking path extending adjacent and alongside at least a part of the at least one side of the roll-way; and said braking parth being equipped with a braking cover.

14. A roll-way comprising:

a multitude of interconnected roll blocks defines at least one side which constitutes at least one side of the roll-way;

each one of said multitude of interconnected roll blocks containing:

a base member having a bottom side for connection to a foundation, and a top side;

a support projecting outwardly from and above said top side of said base member;

a bearing support member mounted at said support;

said bearing support member defining a plane and containing a multitude of groups of integral bearing elements protruding from said plane;

said multitude of groups of bearing elements being symmetrically located with respect to said support;

a multitude of rolling balls each of which is rollingly supported at a respective one of said groups of bearing elements;

a cover member covering said support and said bearing support member on said top side of said base member;

said cover member being mounted at said support;

said cover member containing a multiple number of gaps each of which is aligned to one group of said multitude of groups of bearing elements of said bearing support member wherein one of said rolling balls supported by said one group of bearing elements, partially protrudes outwardly of a respective one of said gaps;

locking elements for interconnecting adjacent ones of said multitude of roll blocks;

a braking path extending adjacent and alongside at least a part of the at least one side of said roll-way; and said braking path being equipped with a braking cover.

* * * * *